Figure 1:
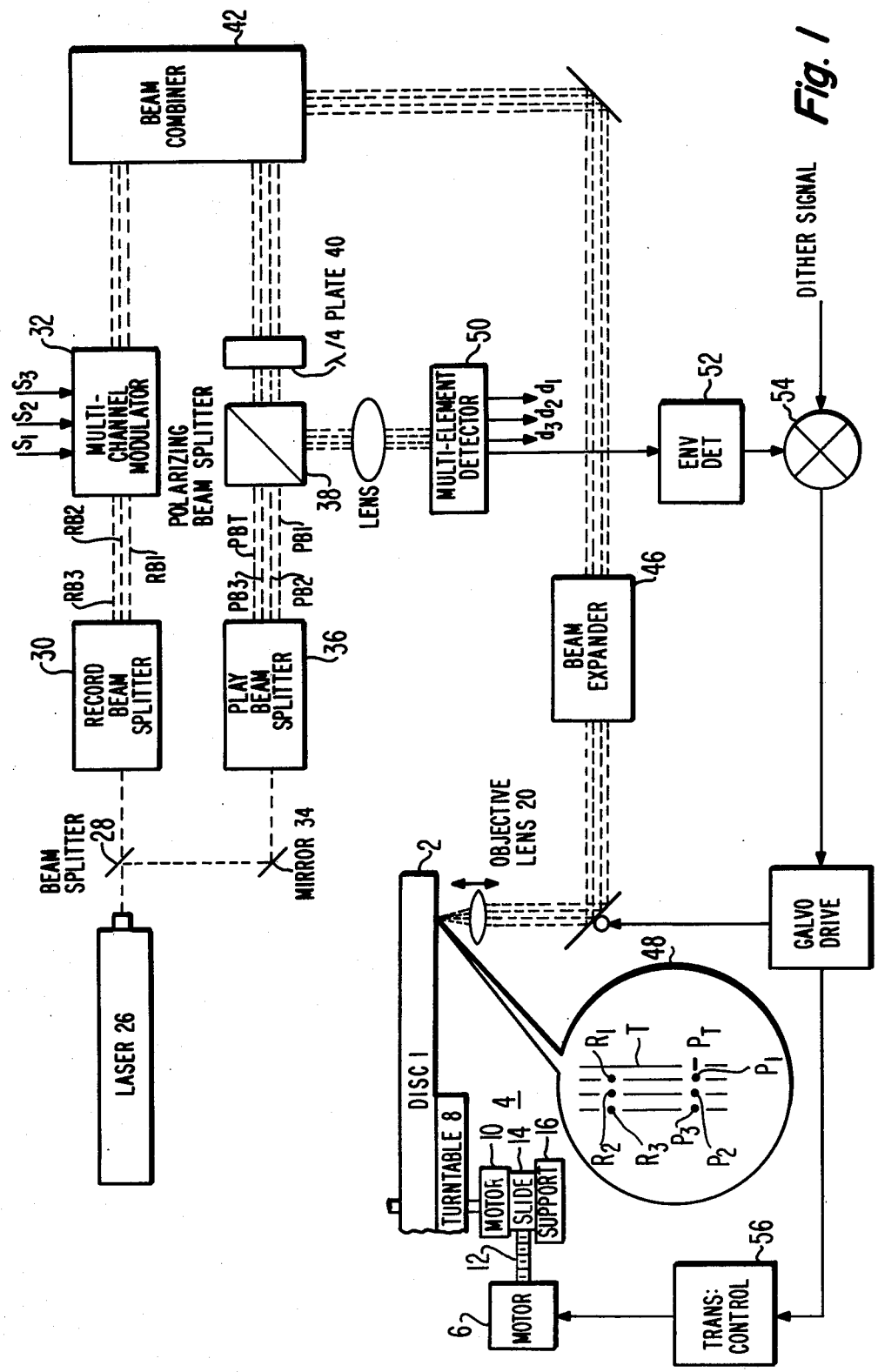

United States Patent [19]

Reno

[11] 4,449,212
[45] May 15, 1984

[54] MULTI-BEAM OPTICAL RECORD AND PLAYBACK APPARATUS

[75] Inventor: Charles W. Reno, Cherry Hill, N.J.
[73] Assignee: RCA Corporation, New York, N.Y.
[21] Appl. No.: 288,550
[22] Filed: Jul. 30, 1981
[51] Int. Cl.³ .......................... G11B 7/00; G02F 1/33
[52] U.S. Cl. ..................... 369/44; 369/112; 350/358
[58] Field of Search .................. 369/43–46, 369/109, 112, 119; 358/201; 350/374, 380, 355, 358, 356; 365/123

[56] References Cited

U.S. PATENT DOCUMENTS

| | | | |
|---|---|---|---|
| 3,502,879 | 3/1970 | Vallese | 358/201 |
| 3,727,062 | 4/1973 | Foster | 350/358 X |
| 3,935,566 | 1/1976 | Snopko | 358/201 X |
| 3,985,952 | 10/1976 | Adler | 369/44 |
| 4,074,085 | 2/1978 | Russell | 179/100.3 |
| 4,094,010 | 6/1978 | Pepperl et al. | 365/215 |
| 4,097,895 | 6/1978 | Spong | 358/128 |
| 4,100,577 | 7/1978 | Naruse et al. | 369/45 |
| 4,118,735 | 10/1978 | Wilkinson | 360/44 |
| 4,198,701 | 4/1980 | Reddersen et al. | 369/44 X |
| 4,222,071 | 9/1980 | Bell | 358/128 |
| 4,223,347 | 9/1980 | Bouwhuis et al. | 358/128.5 |

OTHER PUBLICATIONS

Wai-Hon Lee, "High Efficiency Multiple Beam Gratings", Applied Optics, vol. 18, No. 13, Jul. 1, 1979, pp. 2152–2158.

*Primary Examiner*—Aristotelis M. Psitos
*Attorney, Agent, or Firm*—Joseph S. Tripoli; Robert L. Troike; Christopher L. Maginniss

[57] ABSTRACT

A wideband optical disc data record/playback apparatus is provided. The apparatus includes means for splitting the output of a single laser into multiple beams. The record beams are independently modulated and used to simultaneously record data at extremely high rates on the surface of an optical disc. The apparatus is capable of recording $1 \times 10^{11}$ bits of data on one surface of an optical disc at data rates of 100 to 300 Mb/s. In addition, a plurality of coplanar low power beams are used for playback and data verification purposes. In the playback mode, a single beam is split into a plurality of low power beams and one of the plurality of beams is dithered such that the dithered beam exhibits periodic excursions in a radial direction across the surface of the disc. The dithered beam is used for tracking purposes in both the playback and record mode.

11 Claims, 2 Drawing Figures

MULTI-BEAM OPTICAL RECORD AND PLAYBACK APPARATUS

The Government has rights in this invention pursuant to a Government contract.

This invention relates generally to apparatus for optically reading and recording high density information, digital or analogue, on the surface of a record medium and, more particularly, to apparatus for optically reading and recording data at extremely high data rates where multiple beams must be used.

High density optical recording systems which may be used for recording and playing back information are known in the prior art. For example, U.S. Pat. No. 4,097,895 (Spong) describes an optical disc record/playback system wherein data is recorded in the form of pits in an absorptive coating on the surface of an optical disc. In the Spong system, approximately $1 \times 10^{11}$ bits of information can be stored on one side of a disc-shaped record medium having a 30 cm. diameter.

Storage systems are also known where the rate at which the information is recorded or played back may be increased two, three or more times over a Spong type system by recording or playing back multiple tracks of information simultaneously. In U.S. Pat. No. 4,094,010 to R. Pepperl, et al., a multichannel optical disc storage system is described. In the Pepperl system, a single light beam from a radiation source is split into a plurality of read/record beams by using a multiplicity of partially transmissive beam splitting mirrors. One of the problems with using partially transmissive mirrors to form a plurality of light beams from a single light source for record on playback is aligning the optics. In such a scheme, the optics must be precisely aligned to achieve the highest packing density without creating cross talk between the beams or focused beam spots. Optical alignment can be a time consuming, tedious process. In fact, even after the beams are aligned, there is no assurance of proper operation. Thermal drifts may affect the alignment of the beam splitting optics such that the beams will be misaligned.

In another multibeam scheme described in U.S. Pat. No. 4,074,085 to James T. Russell, multiple sources are used to provide a plurality of record/read beams. In this arrangement, aligning the sources may be as much trouble as aligning the beams in a Pepperl type system. In prior art multibeam optical systems, the optical alignment of the multiple beams could be an obstacle to the proper operation of the apparatus.

Furthermore, high density optical record/playback systems require position servo systems for maintaining high data densities during the recording process and for proper tracking during playback. Prior art multiple beam optical systems, such as Pepperl and Russell, describe systems for maintaining close spacing between adjacent information tracks, however, they suffer generally the same problems as the multiple beam generators described therein-the tracking function is only as good as the beam alignment. If the beams are diverging at the surface of the record medium, unless every beam is being separately tracked, which adds to the complexity of the system, one tracking beam cannot be used practically to guide a plurality of beams.

In accordance with the principles of the present invention, a multibeam optical record/playback apparatus which obviates the problems of the prior art is provided.

In accordance with one aspect of the present invention, a data retrieval system for recovering data from a record medium, where the data has been recorded in a multiplicity of separate tracks on a surface of the record medium, is provided. The system comprises means for supporting the record medium and a light source for providing a beam of light. Further, the system includes means for splitting the light beam emitted by the source into a plurality of light beams and for dithering one of the plurality of light beams such that the dithered beam exhibits periodic excursions orthogonal to the length of the tracks. In addition, the plurality of light beams is directed toward the surface of the record medium by a means for directing. A means for focusing is arranged to focus the light beams as spots on the surface of the record medium. Relative motion is established between the light beam spots and the surface of the record medium. The directing means includes means for deflecting the direction of the plurality of beams during the relative motion. The system also includes means, which is responsive to the position of the light spot of the dithered light beam on the surface of the record medium, for generating a control signal for controlling the deflecting means. The deflecting means is moved to adjust the position of the plurality of light spots in response to the control signal from the generating means.

In accordance with one embodiment of the present invention, the means for splitting the beam of light from the source into a plurality of beams and for dithering the one of the plurality of light beams comprises an acousto-optic device.

In accordance with another aspect of the present invention, a multiple beam optical information recording and retrieval system for use in recording data on and playing back data from a surface of a disc-shaped record medium, the record medium having a spiral track formed on the surface, is provided. The system comprises means for rotating the record medium, a light source for providing a beam of light and a first beam splitter for splitting the beam of light from the light source into a record beam for use in recording data and a play beam for use in retrieving data. Further, the system includes second and third beam splitters. The second beam splitter splits the record beam into a plurality of first light beams wherein each of the plurality of first light beams is of substantially equal intensity. The third beam splitter splits the play beam into a plurality of second light beams and dithers one of the plurality of second light beams such that the dithered light beam exhibits periodic excursions along a radial direction of the disc-shaped record medium. A means is provided for combining the first light beams with the second light beams. The combined light beams are directed toward the surface of the record medium by a means for directing and these light beams are then focused to a plurality of respective diffraction limited spots on the surface of the record medium by a means for focusing. Radial relative motion is established between the plurality of light spots and the surface of the record medium. In this system, the directing means includes means for deflecting the direction of the combined light beams to adjust the position of the plurality of focused light spots on the surface of the record medium. The system also includes means, responsive to the position of the light spot of the dithered light beam on the surface of the record medium for generating a control signal for controlling the deflecting means. The deflecting means is moved to adjust the position of the plurality of light spots in response to the control signal from the generating means.

Figure 2:
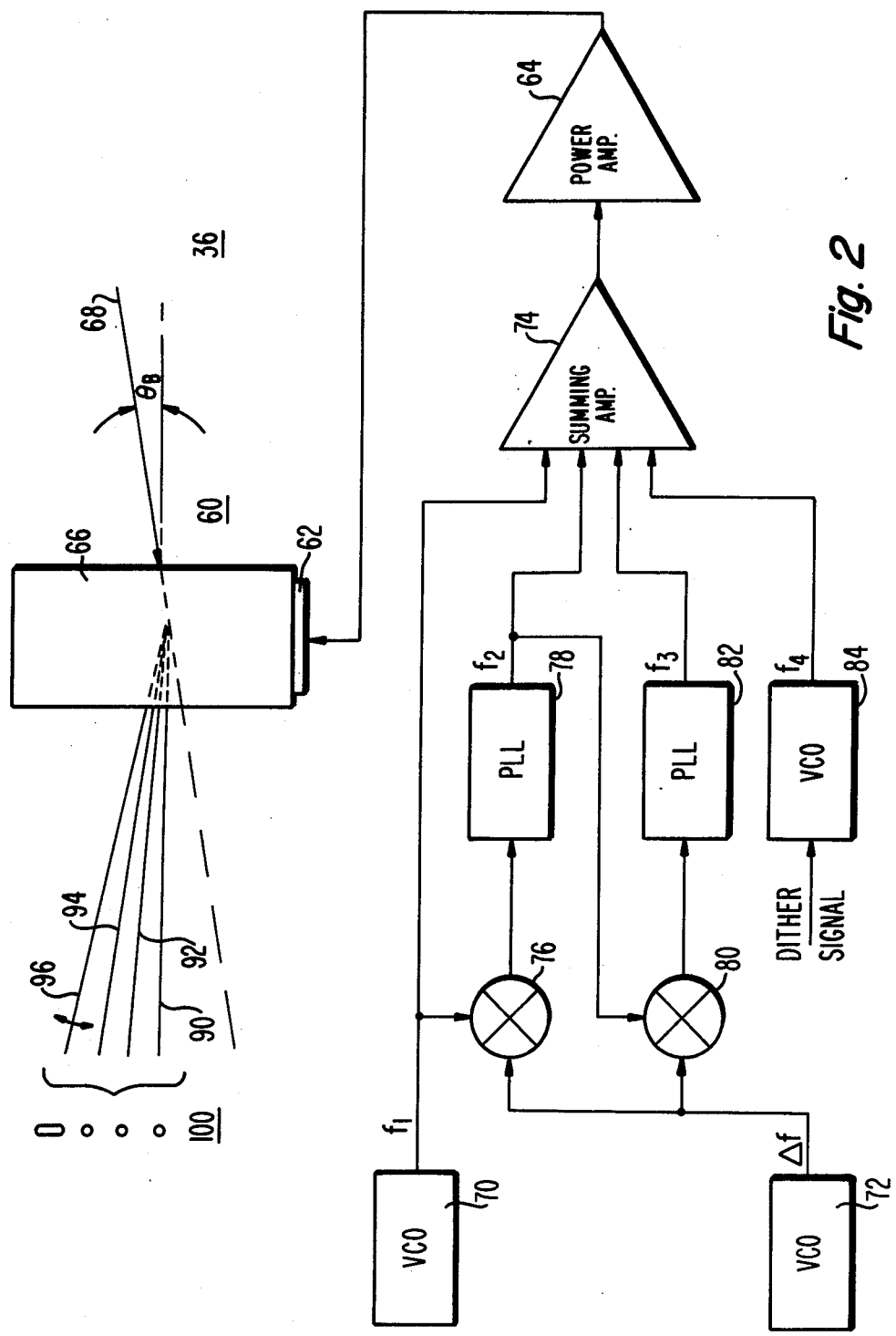

Other features and advantages of the invention will be more fully understood from the following detailed description of the preferred embodiment, the appended claims and the accompanying drawing in which:

FIG. 1 illustrates a multiple beam optical record and playback apparatus in accordance with the principles of the present invention; and FIG. 2 shows a portion of FIG. 1 illustrating the play beam splitter of the present invention.

In accordance with the embodiment of FIG. 1, data are recorded in precisely located tracks for rapid retrieval. Recording is achieved on a light sensitive disc into which data are generally permanently recorded. Data recording is generally effected by ablation or melting. The recorded information is available immediately without further processing of any kind.

A disc 1 as illustrated in FIG. 1 is formed having a light sensitive surface 2 upon which ablative recording by the thermal effects of a focused laser beam may be made. In the embodiment described herein, the surface may be non-reflective for best results. A preferred disc for ablative recording is disclosed in U.S. Pat. No. 4,222,071 issued to A. E. Bell, et al. Disc 1 may be preformatted with a spiral track (illustratively, the spiral track may comprise a series of closely spaced pits) having successive, spaced-apart track convolutions. These track convolutions which may illustratively be approximately 1 μm wide and spaced approximately 4 μm apart form a guide track for use in guiding a tracking beam during recording and playback. This spiral track which will be used primarily for tracking may contain overhead information such as, for example, synchronizing signals, address information and the like.

To provide optical scanning of the surface 2 of disc 1, transport stage 4 is moed linearly by motor 6 at a rate in accordance with the requirements of the desired recording or playback mode while disc 1 is rotated on turntable 8 by motor 10. Transport stage 4 comprises a tracking motor 6 and a feedscrew 12 adapted to be rotated in response to rotations of motor 6. Feedscrew 12 is in mesh engagement with slide 14. When motor 6 is activated so that, for example, feedscrew 12 turns in a clockwise direction, slide 14 will move radially to the right on support 16. Furthermore, if the feedscrew 12 is made to rotate in a counter-clockwise direction, slide 14 will move radially, for example, to the left. Slide 14 may be moved at several different rates of speed during various modes of operation. By means of a motor drive signal which will be described in more detail herein, slide 14 may be moved (i.e., coarse tracking movements) such that the light beams focused by objective lens 20 on surface 2 fall within a few tracks of a desired track location. Fine tracking movements, on the other hand, may be achieved by deflecting the light beams exactly to a desired track by a galvanometer controlled mirror 22. In this arrangement, the galvanometer causes mirror 22 to move about an axis that is parallel to the surface of the mirror for deflecting the impinging light beams onto surface 2 of disc 1 so that the light spots that are formed by lens 20 may be guided along a selected path on surface 2. Mirror 22 is actuated in response to control signals from galvo drive 24. The control signals which are supplied by galvo drive 24 will be described in greater detail herein.

In operation, the light output of light source 26 (illustratively, an argon type laser emitting a monochromatic light beam of a wavelength of 488 nm) is split by beam splitter 28 into a record beam and a play beam (illustratively, 95% of the light beam from laser 26 passes through splitter 28 in a record beam path and 5% is reflected in a play beam path). The record beam passes through to record beam splitter 30. Beam splitter 30 efficiently divides the single record beam into a plurality of separate, equal amplitude, coplanar beams (illustratively, three beams, RB1, RB2, RB3). The equal amplitude beams are then passed through multichannel modulator 32 which independently impresses each beam RB1, RB2, RB3 with the information $S_1$, $S_2$, $S_3$ to be recorded. Illustratively, beam splitter 30 may comprise a phase grating for splitting the single beam into three equal amplitude beams.

The play beam is reflected by mirror 34 to pass through to play beam splitter 36. Beam splitter 36, which will be described in greater detail herein, efficiently divides the single play beam into a plurality of separate, equal amplitude, coplanar beams (illustratively, four beams, PB1, PB2, PB3, PBT). The polariziation of low power play beams PB1, PB2, PB3, PBT is set to allow them to pass through polarizing beam splitter 38 on a first pass. The beams from splitter 38 pass through quarter wave plate 40 to beam combiner 42. In beam combiner 42, the modulated record beams are merged with the low power play beams. Beam combiner 42 aligns the record and play beams so that they can be passed through a common optical system to disc surface 2.

The beams from combiner 42 are reflected by mirror 44 to pass through beam expander 46 where they are expanded to provide the magnification necessary to fill objective lens 20 and allow the formation of diffraction limited spots on surface 2 of disc 1.

As shown in inset 48 of FIG. 1, the record beams RB1, RB2, RB3, are focussed on surface 2 as record spots $R_1$, $R_2$, $R_3$ respectively. Record spots $R_1$, $R_2$, $R_3$ are aligned on disc 1 to form closely spaced (illustratively, 1 μm) parallel information tracks during the recording process. These spots have sufficient power to ablate or melt the absorptive coating on the surface of disc 1 to form pits whose reflectivity is much higher than the normally non-reflective surface. The play beams PB1, PB2, PB3 are focused as spots $P_1$, $P_2$, $P_3$ respectively and are aligned to be colinear with the recorded information tracks at a point where they allow readout of the data just after recording (illustratively, the play spots are positioned to land approximately 40 μm behind the record spots).

Simultaneously, play beam PBT which is to be used for tracking is focused by objective lens 20 to form a diffraction limited spot $P_T$ on the surface of disc 1. When play beam PBT is divided out by beam splitter 36, it is dithered (the operation of beam splitter 36 will be described in more detail herein) such that light spot $P_T$ exhibits periodic excursions in a radial direction across the surface of disc 1. As mentioned above, disc 1 has been preformatted with spiral track T. Light beam PBT which is aligned with both the play beams PB1, etc., and record beams RB1, etc. provides a beam which may be used for tracking the guide track T, thus aligning the record beams in proper relationship during recording and the play beams in proper relationship during playback both being related to the guide track T. The operation of dither tracking will be explained herein.

Light from the playback spots is reflected by the recorded pits on the disc and passed back through the optical system to the polarizing beam splitter 38. At this point, the light polarization of the playback light beams has been retarded by half a wave (i.e., two passes through quarterwave plate 40) and the light is directed to the multielement detector array 50. The changes in disc reflectivity introduced during recording are converted into electrical signals $d_1$, $d_2$, $d_3$ representative of the recorded information $S_1$, $S_2$, $S_3$ respectively. Playback during record is used to verify that the information recorded has been recorded properly. When errors are detected, the data is rerecorded until no errors are detected. In normal playback, the data signals $d_1$, $d_2$, $d_3$ are delivered to suitable processing electronics (not shown) for signal processing.

The operation of the tracking control will now be explained. The playback light beam PBT that impinges as light spot $P_T$ upon guide track T is dithered periodically in a direction perpendicular to the track path. Illustratively, a fifteen (15) KHz dither signal is used to wobble beam PBT. Dithering light beam PBT produces an amplitude modulated signal on detected output signal $d_T$. Detector 52 strips the AM portion of signal $d_T$. This stripped off signal is coupled to multiplier 54. When the spot $P_T$ is centered on the guide track T, the envelope of detector output has an amplitude modulation of twice the dither signal frequency (illustratively, 30 KHz). If the spot $P_T$ is off to one side of the track, the output of detector 52 is at the dither frequency rate and of a particular phase. If the spot $P_T$ is off to the other side of the track, the rate is at the dither frequency but 180 degrees out of phase with the previous case. In multiplier 54, the output from detector 52 is multiplied by the reference signal used to dither the tracking spot. When the spot is centered on tract T, no error signal is produced from multiplier 54. In the off track cases, the output of multiplier 54 provides an error signal of one polarity when the spot is off center in a first direction and of opposite polarity when the spot is off center in a direction opposite to the first. The amplitude of the error signal is proportional to the amount of mistracking which allows proportional control for tracking purposes. The error signal is fed to galvo drive 24 which moves galvanometer controlled mirror 22 to maintain the spot on track. As the average position of mirror 22 increases to a point just short of where the galvanometer cannot deflect the beam anymore, stage 4 is moved to maintain the average position of the galvanometer centered about its deflection range. A galvo position control signal is delivered to translation control 56 which in turn provides a dc signal to motor 6 to move slide 14.

Play beam splitter 36 of FIG. 1 will now be described with reference to FIG. 2. In a preferred embodiment, play beam splitter 36 may comprise an acousto-optic device 60 or Bragg device. Illustratively, device 60 may be an Isomet 1250-C. Device 60 is provided with an electromechanical transducer 62 which is connected to power amplifier 64. When a signal is applied to transducer 62, acoustic waves of the frequency of the applied signal are produced in the medium 66 of the device which may be, for example, glass. If the playback light beam 68 is incident on the device at the Bragg angle, $\theta_B$, it will be deflected by the acoustic waves into a set of first order beams. The magnitude of the deflection angle is proportional to the frequency of the signal applied and the intensity of the deflected beam is determined by the amplitude of the applied signal.

The operation of acousto-optic device 60 will now be explained. Voltage controlled oscillator 70 provides a signal having a frequency $f_1$ (illustratively, $f_1=260$ MHz) and voltage controlled oscillator 72 provides a signal having a frequency $\Delta f$ (illustratively, $\Delta f=40$ MHz). The signal of frequency $f_1$ is provided to one of the summing nodes of summing amplifier 74 and to one input of mixer 76. The other input to mixer 76 is supplied by VCO 72. The output of mixer 76 will be a signal having sum and difference frequency components (illustratively, $f_1-\Delta f$ or 220 MHz and $f_1+\Delta f$ or 300 MHz). The signals from mixer 76 are passed through narrow band filter (i.e., phase locked loop) 78 to another summing node of summing amplifier 74 and to one input of mixer 80. Filter 78 passes only the desired frequency $f_2$ from mixer 76 (illustratively, $f_1-\Delta f$ or 220 MHz). The output signal of frequency $f_2$ from filter 78 is mixed with the signal of frequency $\Delta f$ in mixer 80. The output of mixer 80 will have sum and difference frequency components (illustratively, $f_2-\Delta f$ or 180 MHz and $f_2+\Delta f$ or 260 MHz). Narrow band filter (i.e., phase locked loop) 82 passes the desired signal of frequency $f_3$ (illustratively, $f_3=180$ MHz) to the third summing node of summing amplifier 74.

The fourth signal of frequency $f_4$ is supplied to summing amplifier 74 via voltage controlled oscillator 84. VCO 84 is frequency modulated at the dither frequency rate (illustratively, VCO 84 is driven between 134 MHz and 146 MHz at a 15 KHz rate).

The acousto-optic device 60 is driven by four signals of frequencies $f_1$, $f_2$, $f_3$, and $f_4$. The signals of frequencies $f_1$, $f_2$, and $f_3$ deflect the incident beam 68 to produce sub-beams 90, 92, 94 whose angle of deflection is proportional to the frequency, $f_1$, $f_2$, and $f_3$, respectively. The fourth sub-beam 96 is deflected by the signal of frequency $f_4$ which varies at the dither rate, thus causing sub-beam 96 to exhibit periodic excursions at the dither frequency rate. Spots 100 represent the playback spots as they would appear on the surface of disc 1.

It should be noted that the frequencies of the drive signals to acousto-optic device 60 should be chosen such that any unwanted beat frequency signals are outside of the bandwidth of the data channels. In the process of generating the multiple beams, each of the sub-beams is shifted in frequency by an amount equal to the frequency of signal used to generate that beam. When the light from the sub-beam is reflected from the disc surface and imaged onto an array of photodetectors, a small amount of light from each of the beams is found in spacial locations corresponding to the other beams on the array. Due to the shifts in the light frequency, these beams may interfere with each other to produce beats which may, if the frequencies are not properly chosen, interfer with the data recovery process.

While the principles of the present invention have been demonstrated with particular regard to the illustrated structure of the FIGURES, it will be recognized that various departures from such illustrated structure may be undertaken in practice of the invention. For example, the beam splitting and dithering techniques described herein may be replaced by other techniques such as those described in U.S. Patent Application entitled "Multi-Beam Optical Record and Playback Apparatus Having an Improved Beam Splitter" filed for S. L. Corsover, et al., concurrently herewith.

What is claimed is:

1. A data retrieval system for recovering data from a record medium, said data being recorded in a multiplicity of separate tracks on a surface of said record medium, said system comprising:
- means for supporting said record medium;
- a light source for providing a beam of light;
- means for splitting said beam of light into a plurality of light beams, said splitting means effecting a dithering of one of said plurality of light beams such that said one of said plurality of light beams exhibits periodic excursions orthogonal to the elongated dimension of said tracks, said splitting means having a single transducer which is driven by a plurality of drive signals which deflect said beam of light to produce said plurality of light beams, the angle of deflection of each of said plurality of light beams being proportional to the frequency of the drive signal used to deflect said each of said light beams, one of said plurality of drive signals having a variable frequency for dithering said one of said plurality of light beams;
- means for directing said plurality of said light beams toward said surface of said record medium;
- means for focusing said plurality of said light beams, directed by said directing means, to produce diffraction limited spots on said surface of said record medium;
- means for establishing relative motion between said light beam spots and said surface of said record medium;
- said directing means including means for deflecting the direction of said plurality of beams during said relative motion;
- means, responsive to the position of said light spot of said dithered light beam on said surface of said record medium, for generating a control signal for controlling said deflecting means; and
- said deflecting means being moved to adjust the direction of said plurality of beams in response to said control signal from said generating means.

2. The apparatus according to claim 1 wherein said means for splitting said beam of light provided by said light source into a plurality of light beams and for dithering one of said plurality of light beams comprises an acousto-optic device.

3. An information retrieval system for recovering data from a surface of a disc-shaped record medium having said data recorded along a multiplicity of successive, elongated tracks on said surface of said record medium, said system comprising:
- means for rotating said disc-shaped record medium;
- a light source for providing a beam of light;
- means for splitting said beam of light into a plurality of light beams, said splitting means effecting a dithering of one of said plurality of light beams such that said one of said plurality of light beams exhibits periodic excursions along a radial direction of said disc-shaped record medium, said splitting means having a single transducer which is driven by a plurality of drive signals which deflect said beam of light to produce said plurality of light beams, the angle of deflection of each of said plurality of light beams being proportional to the frequency of the drive signal used to deflect said each of said light beams, one of said plurality of drive signals having a variable frequency for dithering said one of said plurality of light beams;
- means for directing said plurality of said light beams toward said surface of said record medium;
- means for focusing said plurality of said light beams, directed by said directing means, to a plurality of respective diffraction limited spots on said surface of said record mediium;
- means for effecting radial relative motion between said plurality of light spots and said surface of said disc-shaped record medium;
- said directing means including means for deflecting the direction of said plurality of light beams to adjust the position of said plurality of focused light spots on said surface of said record medium;
- means, responsive to the position of said light spot of said dithered light beam on said surface of said record, for generating a control signal for controlling said deflecting means; and
- said deflecting means being moved to adjust the position of said plurality of light spots in response to said control signal from said generating means.

4. The system according to claim 3 wherein said means for splitting said light beam provided by said light source into a plurality of light beams and for dithering one of said plurality of light beams comprises an acousto-optic device.

5. The system according to claim 4 wherein said drive signals comprise:
- a first signal of a first frequency, a second signal of a second frequency, the difference in frequency between said first and said second frequencies being a given frequency, and a third signal of a third frequency, the difference in frequency between said second and said third frequencies being equal to said given frequency.

6. An information retrieval system for recovering data from a surface of a disc-shaped record medium having said data recorded along a multiplicity of successive, elongated tracks on said surface of said record medium, said system comprising:
- means for rotating said disc-shaped record medium;
- a light source for providing a beam of light;
- an acousto-optic device for splitting said light beam into a plurality of light beams and for dithering one of said plurality of light beams such that said one of said plurality of said light beams exhibits periodic excursions along a radial direction of said disc-shaped record medium;
- said acousto-optic device being driven by a drive circuit which provides a plurality of signals, each of said signals effecting a diffraction of a portion of said light beam provided by said light source, said diffraction being effected at an angle proportional to the frequency of each of said signals, one of said plurality of signals being frequency modulated to effect said dithering of said one of said plurality of light beams, said drive circuit providing a first signal of a first frequency, a second signal of a second frequency, the difference in frequency between said first and said second frequencies being a given frequency, and a third signal of a third frequency, the difference in frequency between said second and said third frequencies being equal to said given frequency;
- said drive circuit comprising:
- a first signal source supplying said first signal of said first frequency;
- a difference signal source supplying a difference signal of said given frequency;
- a first mixer for combining said first signal and said difference signal to produce said second signal;

a second mixer for combining said second signal and said difference signal to produce said third signal;

means for directing said plurality of said light beams toward said surface of said record medium;

means for focusing said plurality of said light beams, directed by said directing means, to a plurality of respective diffraction limited spots on said surface of said record medium;

means for effecting radial relative motion between said plurality of light spots and said surface of said disc-shaped record medium;

said directing means including means for deflecting the direction of said plurality of light beams to adjust the position of said plurality of focused light spots on said surface of said record medium;

means, responsive to the position of said light spot of said dithered light beam on said surface of said record, for generating a control signal for controlling said deflecting means; and said deflecting means being moved to adjust the position of said plurality of light spots in response to said control signal from said generating means.

7. The system according to claim 6 wherein said drive circuit further comprises:

a third signal source for supplying a third signal; said third signal source being frequency modulated such that said third signal varies in frequency at a rate equal to the rate at which said one of said plurality of light beams is being dithered.

8. The system according to claim 7 wherein said first, second and third signal sources are voltage controlled oscillators.

9. The system according to claim 8 wherein said drive circuit further comprises a first narrow bandwidth filter coupled to said first mixer, for passing said second signal, and a second narrow bandwidth filter, coupled to said second mixer, for passing said third signal.

10. A multiple beam optical information recording and retrieval system for use in recording data on and playing back data from a surface of a disc-shaped record medium, said record medium having a spiral track formed on said surface, said system comprising:

means for rotating said disc-shaped record medium;

a light source for providing a beam of light;

a first beam splitter for splitting said beam of light into a record beam for use in recording data on said record medium surface and a play beam for use in retrieving data recorded on said record medium;

a second beam splitter for splitting said record beam into a first plurality of light beams, each of said plurality of first light beams being of substantially the same intensity;

a third beam splitter for splitting said play beam into a second plurality of light beams, said third beam splitter effecting a dithering of one of said light beams in said second plurality such that said one of said second plurality of light beams exhibits periodic excursions along a radial direction of said disc-shaped record medium, said third beam splitter having a single transducer which is driven by a plurality of drive signals which deflect said beam of light to produce said plurality of light beams, the angle of deflection of each of said plurality of light beams being proportional to the frequency of the drive signal used to deflect said each of said light beams, one of said plurality of drive signals having a variable frequency for dithering said one of said plurality of light beams;

means for combining said first plurality of light beams with said second plurality of light beams;

means for directing said combined light beams torward said surface of said record medium;

means for focusing said combined light beams, directed by said directing means, to a plurality of respective diffraction limited spots on said surface of said record medium;

means for establishing radial relative motion between said plurality of light spots and said surface of said record medium;

said directing means including means for deflecting the direction of said combined light beams to adjust the position of said plurality of focused light spots on said surface of said record medium.

11. The system according to claim 10 wherein said third beam splitter comprises an acousto-optic device.

* * * * *

UNITED STATES PATENT AND TRADEMARK OFFICE
CERTIFICATE OF CORRECTION

PATENT NO. : 4,449,212

DATED : May 15, 1984

INVENTOR(S) : Charles William Reno

It is certified that error appears in the above-identified patent and that said Letters Patent is hereby corrected as shown below:

In the title, on the title page (INID code [54]) and column 1, line 3, after "APPARATUS" add --HAVING MEANS FOR SPLITTING A SINGLE BEAM INTO A PLURALITY OF BEAMS AND DITHERING ONE OF THE PLURALITY OF BEAMS--.

Signed and Sealed this

Eighteenth Day of September 1984

[SEAL]

Attest:

GERALD J. MOSSINGHOFF

Attesting Officer

Commissioner of Patents and Trademarks